(12) United States Patent
Heitland et al.

(10) Patent No.: US 7,484,935 B2
(45) Date of Patent: Feb. 3, 2009

(54) TURBINE ROTOR HUB CONTOUR

(75) Inventors: Gregory B. Heitland, Mesa, AZ (US);
Costas Vogiatzis, Gilbert, AZ (US)

(73) Assignee: Honeywell International Inc.,
Morristown, NJ (US)

( * ) Notice: Subject to any disclaimer, the term of this patent is extended or adjusted under 35 U.S.C. 154(b) by 546 days.

(21) Appl. No.: 11/144,472

(22) Filed: Jun. 2, 2005

(65) Prior Publication Data

US 2006/0275126 A1    Dec. 7, 2006

(51) Int. Cl.
*F01D 5/30* (2006.01)
(52) U.S. Cl. .............................. 416/193 A; 416/193 R
(58) Field of Classification Search .............. 415/173.1, 415/173.6, 914; 416/193 R, 193 A, 191, 416/194, 195
See application file for complete search history.

(56) References Cited

U.S. PATENT DOCUMENTS

| | | |
|---|---|---|
| 2,735,612 A | 2/1956 | Hausmann |
| 4,194,869 A | 3/1980 | Corcokios |
| 4,278,400 A | 7/1981 | Yamarik et al. |
| 5,167,489 A | 12/1992 | Wadia et al. |
| 5,275,531 A | 1/1994 | Roberts |
| 5,525,038 A | 6/1996 | Sharma et al. |
| 5,735,673 A | 4/1998 | Matheny et al. |
| 6,017,186 A | 1/2000 | Hoeger et al. |
| 6,050,777 A | 4/2000 | Tabbita et al. |
| 6,283,713 B1 | 9/2001 | Harvey et al. |
| 6,503,059 B1 | 1/2003 | Frost et al. |
| 6,561,761 B1 | 5/2003 | Decker et al. |
| 7,189,056 B2 * | 3/2007 | Girgis et al. ................. 415/115 |

\* cited by examiner

*Primary Examiner*—Edward Look
*Assistant Examiner*—Dwayne J White
(74) *Attorney, Agent, or Firm*—Ingrassia Fisher & Lorenz, P.C.

(57) ABSTRACT

Disclosed herein is a turbine rotor having a contoured hub comprising a cambered surface extending from a leading edge of the rotor hub to a trailing edge of the rotor hub along an axial direction of the rotor hub. A turbine rotor and a gas turbine engine comprising a turbine rotor flow path having a cambered surface are also disclosed, together with a method providing a turbine rotor flow path for a turbine rotor hub.

8 Claims, 10 Drawing Sheets

TURBINE ROTOR HUB CONTOUR

GOVERNMENT RIGHTS

This invention was made with the support of the United States Government under Contract DAAH10-03-2-0007 issued by the U.S. Army. The Government may have certain rights to this invention.

BACKGROUND OF THE INVENTION

The present invention generally relates to apparatus and methods for a contoured turbine rotor hub. More specifically, the present invention relates to apparatus and methods relating to a turbine rotor hub comprising a cambered surface.

Turbine engines may include a compressor section, wherein inlet air is compressed, followed by a combustor section wherein fuel is combusted with the compressed air to generate exhaust gas. The exhaust gas is then directed to a turbine section, wherein energy is extracted from the exhaust gas. Turbine engines including the compressor and turbine sections may comprise a series of confined passages wherein a cascade of stationary vanes and rotating blades are arranged to produce and then remove energy from a working fluid (i.e., from combustion of a fuel.) The geometry and positioning of these vanes and blades relative to one another may determine the efficiency at which a particular turbine engine operates.

U.S. Pat. No. 2,735,612 is directed to improvements in passage configurations for interblade passages in compressor sections and diffusers such as in an air inlet diffuser of a gas turbine engine; the reference does not disclose configurations of the turbine section hub.

U.S. Pat. No. 6,561,761 is directed to a compressor section flow path which includes circumferentially spaced apart airfoils having axially spaced apart outer and inner ends. An outer wall bridges the airfoil outer ends, and an inner wall bridges the inner ends. One of the walls includes a flute adjacent the leading edge for locally increasing flow area thereat. Again, the '761 patent does not disclose modifications of the turbine section hub.

In addition to compressor flow paths, gas turbine engines may also include turbine section flow paths to and from turbine rotors having rotating blades positioned within the exhaust stream to extract energy from exhaust gasses produced during the combustion process. The flow paths to and from turbine rotors may also comprise stationary vanes and other surfaces which may be dimensioned and arranged within the exhaust gas flow path to optimize the amount of energy extracted, and extend rotor life.

While prior references are directed to turbine rotor blade design, the space between the turbine rotor blades, referred to herein as the turbine rotor hub region, and the turbine rotor flow path between the airfoils generally has been largely ignored. Prior art turbine rotor flow paths are typically comprised of a straight flat surface from the rotor leading edge to the rotor trailing edge along the rotor hub.

As can be seen, there is a need for optimization of flow paths relating to the turbine rotor hub of a gas turbine engine.

SUMMARY OF THE INVENTION

In one aspect of the present invention, a turbine rotor comprises an axially cambered surface extending at least a portion of the way from a leading edge of a rotor hub to a trailing edge of the rotor hub along a central axis of the rotor hub.

In another aspect of the present invention, a turbine rotor comprises a turbine rotor hub having a plurality of blades spaced circumferentially apart about a central axis, and each of the blades extending at least a portion of the way from a leading edge of the turbine rotor hub to a trailing edge of the turbine rotor hub, the blades having a blade height extending radially from the trailing edge of the turbine rotor hub to a rotor tip located at a blade end of the blade located at a trailing edge of the blade; the turbine rotor hub defining a rotor flow path disposed between an adjacent pair of the blades, wherein the rotor flow path comprises a cambered surface from the leading edge of the turbine rotor hub to the trailing edge of the turbine rotor hub.

In yet another aspect of the present invention, a turbine rotor comprises a first turbine rotor hub having a plurality of blades spaced circumferentially apart about a central axis, each of the blades extending axially from a leading edge of the first turbine rotor hub to a trailing edge of the first turbine rotor hub; the first turbine rotor hub defining a rotor flow path disposed between an adjacent pair of the blades, wherein the rotor flow path is defined by a cambered surface extending at least a portion of the total axial distance from the leading edge of the first turbine rotor hub to the trailing edge of the first turbine rotor hub; wherein the cambered surface includes a point of extremum having a peak height measured radially from the point of extremum to a base line which extends from the leading edge to the trailing edge of the first turbine rotor hub, wherein the point of extremum is located axially at a point on the cambered surface such that a static pressure between a suction side of the blade and the first turbine rotor hub is less than a static pressure determined under identical conditions of a comparative second turbine rotor hub having an identical configuration compared to the first turbine rotor except that the comparative second turbine rotor hub comprises a flat planer rotor surface between an adjacent pair of the blades of the comparative second turbine rotor hub.

In still another aspect of the present invention, a gas turbine engine comprises a compressor section, a combustor section, and a turbine section, wherein the turbine section comprises a turbine rotor capable of rotation about a central axis; the turbine rotor comprising a turbine rotor hub having a plurality of blades space circumferentially apart about the central axis, and extending from a leading edge of the turbine rotor hub to a trailing edge of the turbine rotor hub, the turbine rotor hub defining a rotor flow path disposed between each adjacent pair of the blades, wherein the rotor flow path comprises a cambered surface from the leading edge of the rotor hub to the trailing edge of the rotor hub; the cambered surface comprising a continuous arc of curvature adjacent between the leading edge of the turbine rotor hub and the trailing edge of the turbine rotor hub; and the cambered surface comprising a point of extremum positioned at less than 50% of the total distance between the leading edge of the turbine rotor hub and the trailing edge of the turbine rotor hub.

In yet another aspect of the present invention, a method of providing a turbine rotor flow path on a first turbine rotor comprises the steps of determining a second comparative static pressure profile at a plurality of locations between a suction side of a turbine rotor blade and a second comparative turbine rotor hub of a second comparative turbine rotor under a set of conditions, wherein the second comparative turbine rotor comprises a second comparative turbine rotor hub having a plurality of blades space circumferentially apart about a central axis, each of the blades extending from a leading edge of the second comparative turbine rotor hub to a trailing edge of the second comparative turbine rotor hub; wherein the second comparative turbine rotor hub further comprises a flat planer rotor flow path between an adjacent pair of the blades of the second comparative turbine rotor hub, the flat planer rotor flow path extending from the leading edge of the second comparative turbine rotor hub to a trailing edge of the second comparative turbine rotor hub; and arranging a first turbine rotor hub of first turbine rotor, the first turbine rotor hub having a cambered surface extending from at least a portion of the axial distance from a leading edge of the first turbine rotor hub to a trailing edge of the first turbine rotor hub, wherein the first turbine rotor is identical to the second comparative turbine rotor except that the first turbine rotor comprises the cambered surface; wherein the cambered surface is arranged on the first turbine rotor hub such that a first static pressure profile is less than the comparative second static pressure profile.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides a cambered turbine rotor hub and hub flow path for gas turbine engines useful in commercial/military aircraft-fixed wing/ rotorcraft, and the like.

The cambered turbine rotor hub and resulting hub flow path of the present invention is in contrast to the prior art, wherein a prior art turbine rotor hub is comprised of a straight flat surface from the prior art turbine rotor leading edge to the prior art turbine rotor trailing edge, and wherein the straight flat surface of the prior art hub provides a straight hub flow path.

Figure 1:
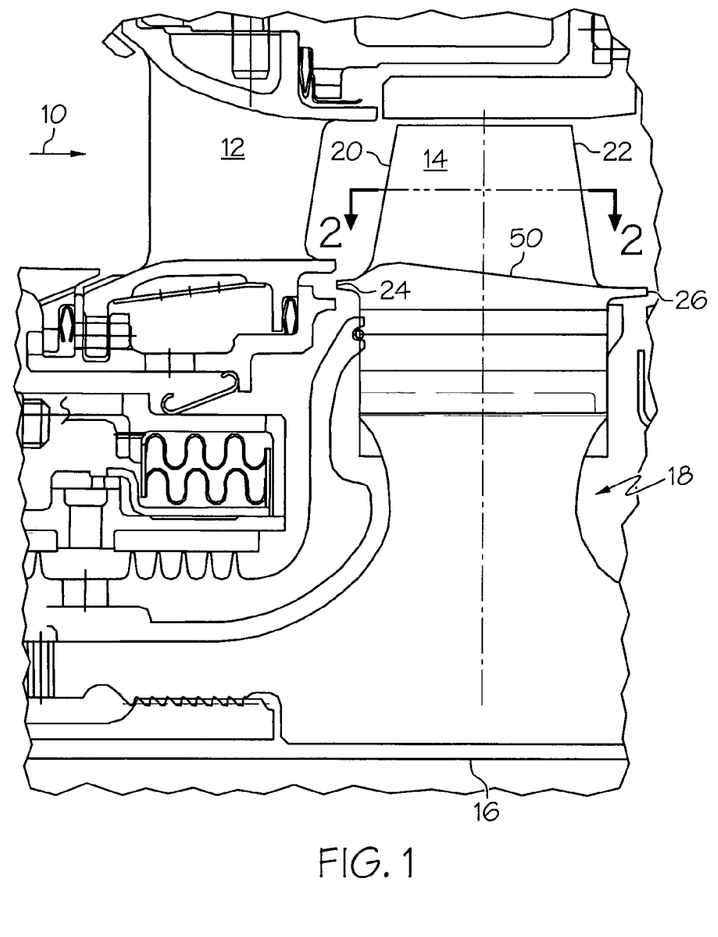
FIG. 1 is a partial cross-sectional view of a turbine section of a gas turbine engine of the present invention.

In more specifically describing the present invention, FIG. 1 shows a partial cross section of a turbine section of a gas turbine engine 52. Fluid, typically exhaust gas, travels along the flow path indicated by arrow 10, across a stator 12, which may be stationary, and then across a turbine blade 14 disposed on a turbine rotor 18, which rotates about a central axis 16. Turbine rotor 18 may have a rotor leading edge 24 and a rotor trailing edge 26 located downstream of rotor leading edge 24. Turbine blade 14 may have a turbine blade leading edge 20 located proximate to rotor leading edge 24, and a turbine blade trailing edge 22 located downstream of turbine blade leading edge 20.

Figure 2:
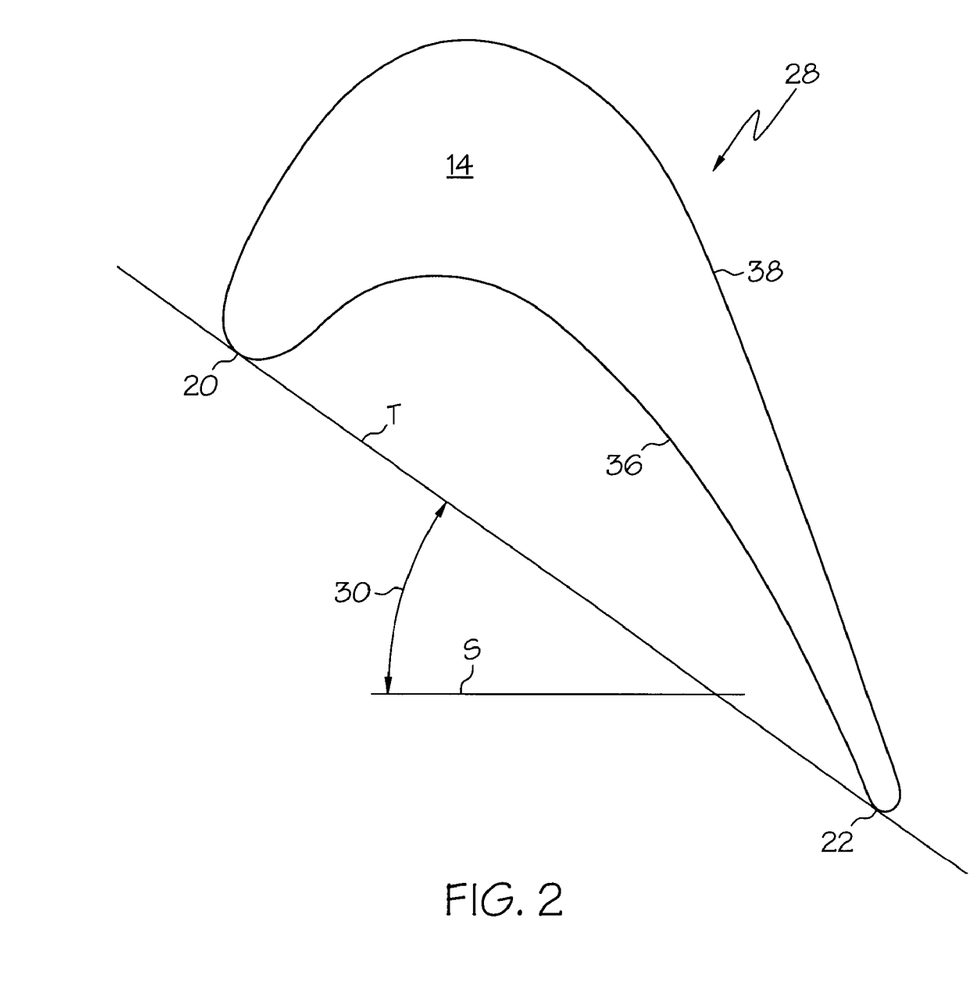
FIG. 2 is a cross-sectional view along line 2-2 in FIG. 1.

As shown in FIG. 2, which depicts a cross sectional view along line 2-2 shown in FIG. 1, turbine blade 14 may have an airfoil shape 28, designed to extract energy from exhaust gases flowing along flow path 10. Turbine blade 14 may have a pressure side 36 and a suction side 38. Stagger angle 30 of rotor blade 14 may be the angle between line T, drawn from turbine blade leading edge 20 to turbine blade trailing edge 22, and line S, which is parallel to central axis 16 (FIG. 1). It has been discovered that as the stagger angle is lowered, less force acts on rotor blade 14. Accordingly, use of a low stagger angle 30 may allow for an increase in rotor blade life. However, the lower the stagger angle, the less efficient a gas turbine engine will be.

Figure 3:
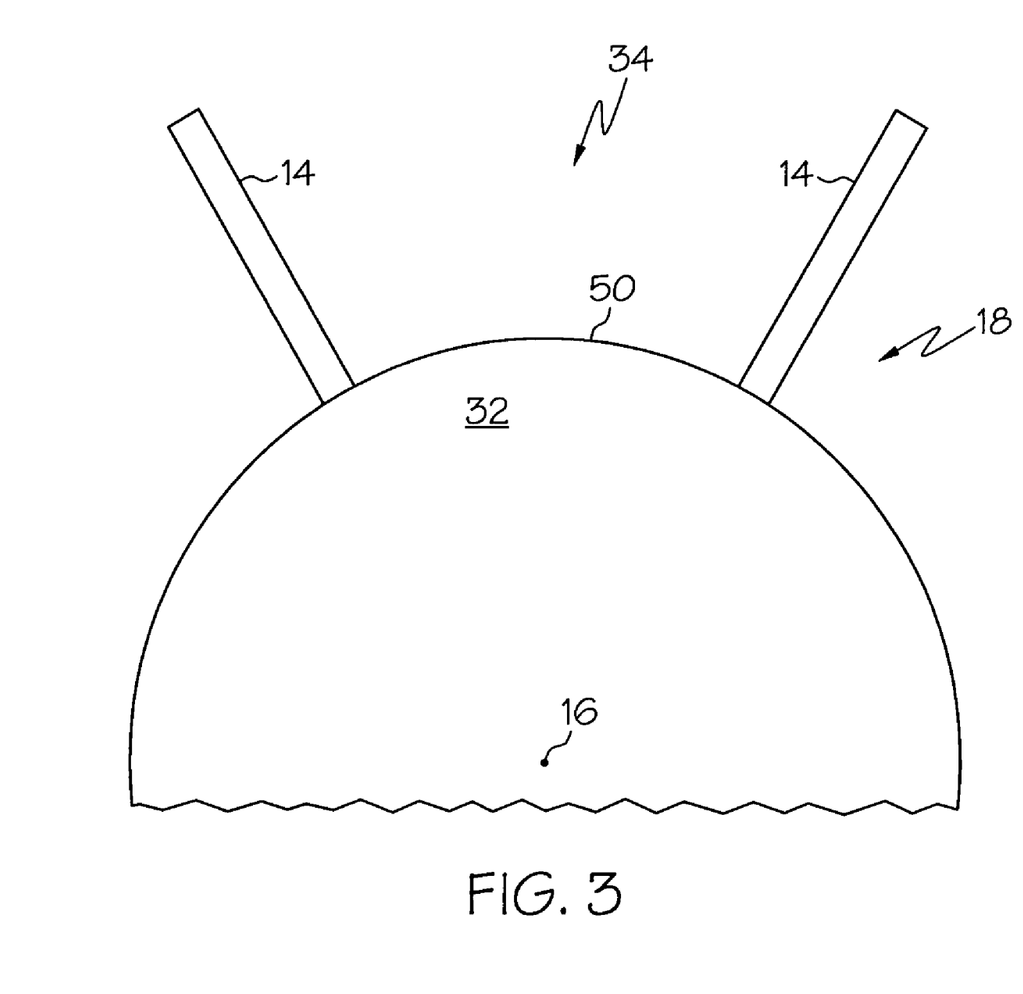
FIG. 3 a frontal cross-sectional view of a turbine rotor of the present invention.

FIG. 3 depicts a frontal cross section of turbine rotor 18 along rotor leading edge 24. As shown in FIG. 3, turbine rotor 18 may comprise a turbine rotor hub 32 from which a plurality of turbine blades 14 may extend radially outward to the turbine rotor tip there from in a direction away from central axis 16. Turbine blades 14 may be spaced circumferentially apart about central axis 16. Between turbine blades 14 may be turbine rotor flow path 34 which extends from rotor leading edge 24 to rotor trailing edge 26 on rotor hub 32.

Figure 4A:
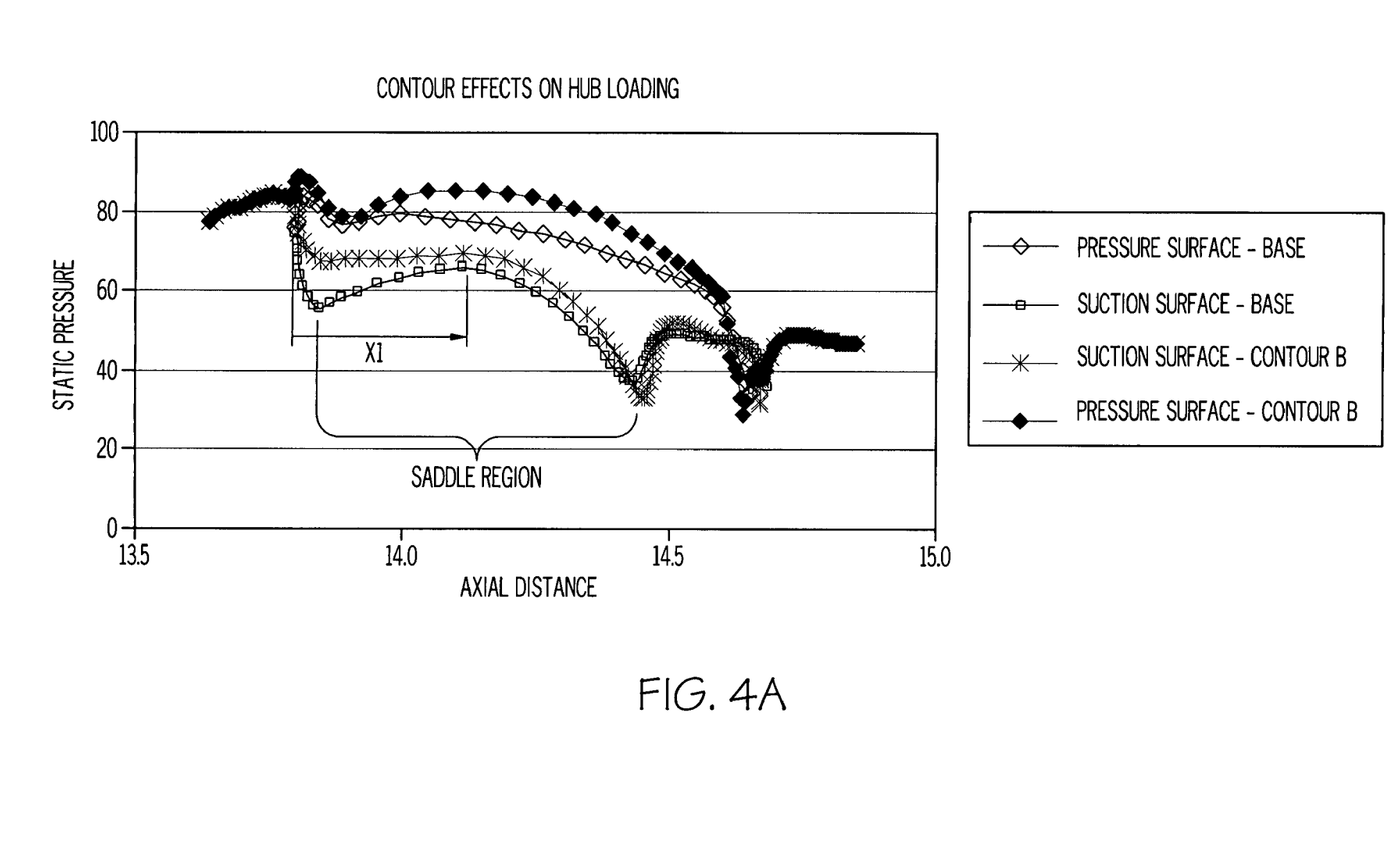
FIG. 4 is a graph of static pressure along a rotor flow path in concert with a first rotor flow path of the present invention having a cambered surface, and a second rotor flow path of the prior art.
Figure 4B:
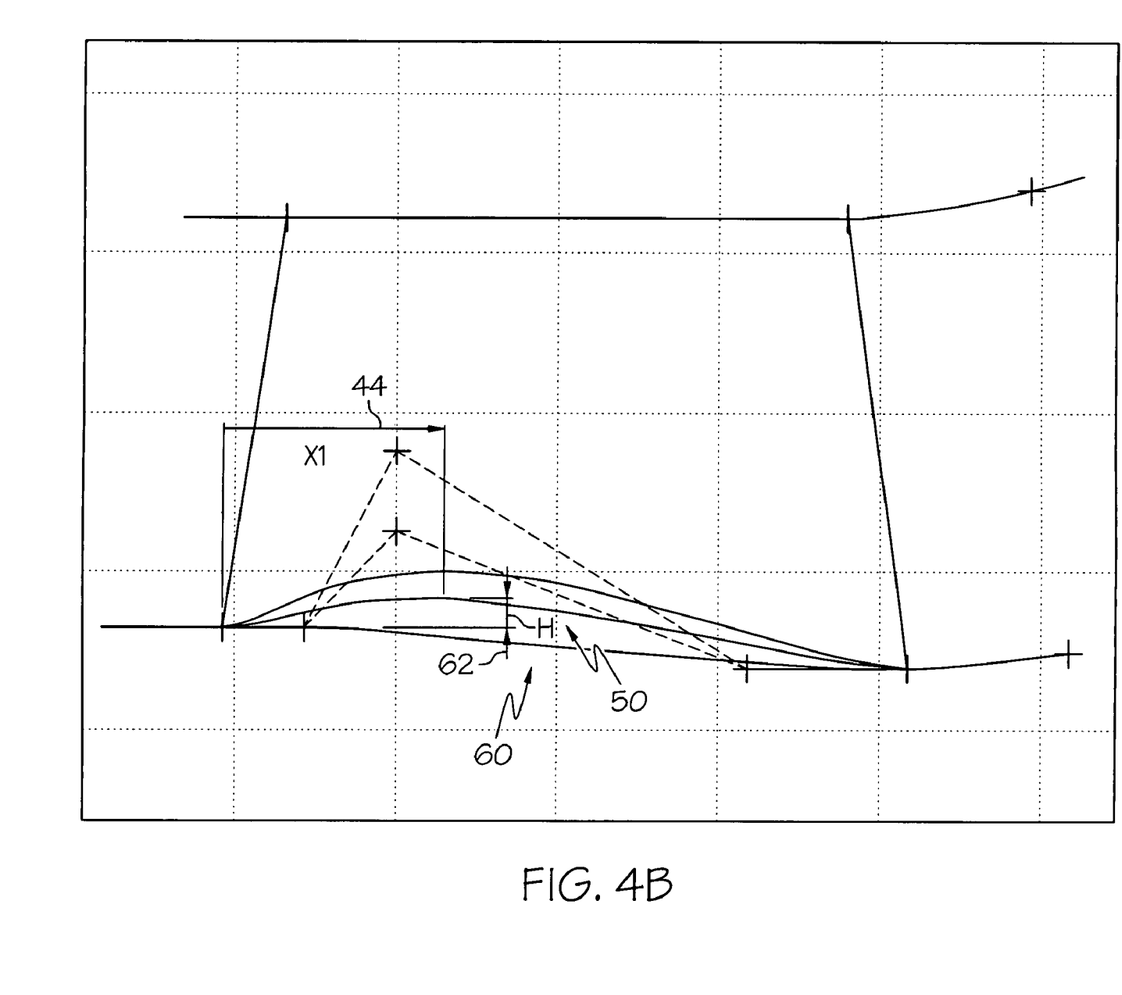

Referring to FIG. 4B, using as a baseline a prior art turbine rotor having a turbine rotor hub flow path which is comprised of a straight flat hub axial surface 60 from the rotor leading edge 24 to the rotor trailing edge 26, applicants unexpectedly discovered a rise in static pressure along the suction side of the turbine rotor blade. The result of this rise in static pressure along the prior art turbine rotor flow path was found to be a loss generating saddle-type loading which may decrease gas turbine engine performance.

Using a prior art turbine rotor (i.e., a turbine rotor having a flat linear turbine rotor hub flow path) applicants next evaluated the static pressure distribution of fluid flowing over and around turbine rotor hub 32 under operational conditions, to determine the location (relative to the rotor leading edge) and the magnitude of the diffusing "saddle" region on the rotor hub flow path proximate to the suction side of the turbine rotor blade. The results of this analysis are shown graphically in FIG. 4A, which show the static pressure versus the axial distance of fluid flow about turbine rotor hub 32 (FIG. 4B), and the cambered surface 50 of turbine rotor hub 32.

Applicants next discovered that by implementing local contouring on rotor hub flow path 34 (i.e., providing a rotor hub flow path having a cambered surface 50), an accelerating flow field could be created which would eliminate the diffusing "saddle" region on the suction side 38 of rotor blade 14. Accordingly, by providing a contoured turbine rotor flow path 34 and thus reducing or eliminating the associated "saddle" loss produced by prior art turbine rotor flow paths, the performance of the gas turbine engine 52 (see, e.g., FIG. 8) may be increased.

Figure 5:
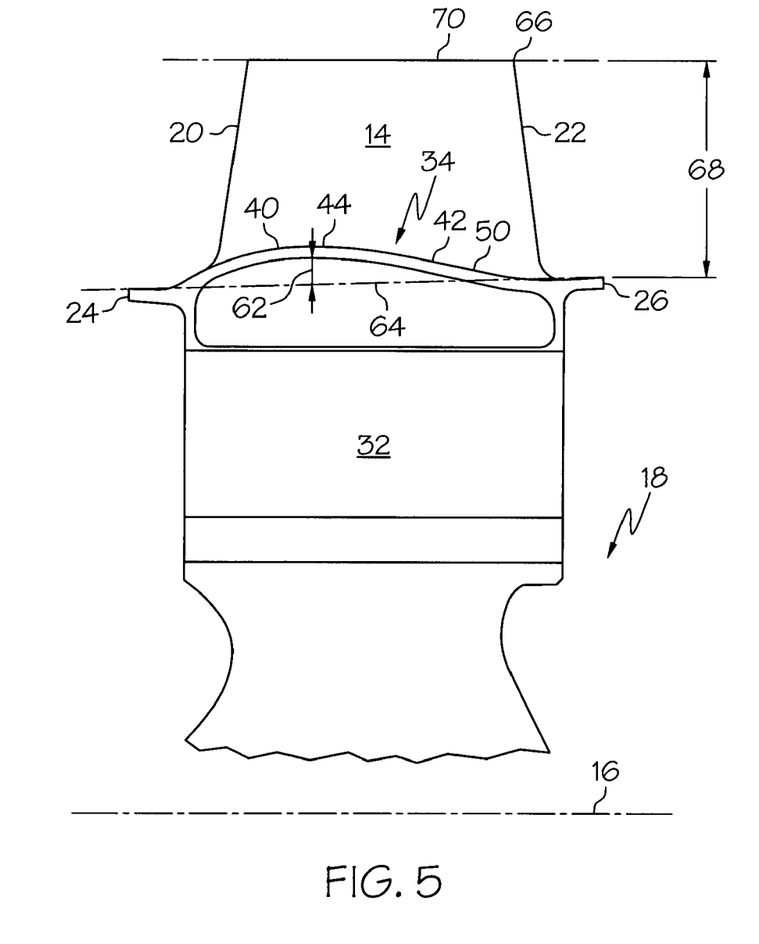
FIG. 5 is a cross section of a turbine rotor of the present invention.

In an embodiment, with reference to FIG. 5, rotor hub flow path 34 may be contoured in that it may comprise cambered surface 50 extending axially between rotor leading edge 24 and rotor trailing edge 26 of turbine rotor hub 32. Such an embodiment of the present invention (i.e., a turbine rotor hub flow path 34 comprising cambered surface 50) as is shown in FIG. 5.

In an embodiment of the present invention as shown in FIG. 5, a cross section taken along central axis 16 of turbine rotor hub 32 shows a surface of turbine rotor hub 32 defining flow path 34, wherein the surface of turbine rotor hub 32 may have a curved shape. In another embodiment, with reference to FIG. 5, turbine rotor hub 32 may comprise a first axially curved portion 40 curved in a direction away from central axis 16, hence the turbine rotor flow path 34 is defined, in part, by the cambered surface 50 of turbine rotor hub 32. Turbine rotor hub 32 may also comprise a second axially curved portion 42, curved in a direction towards the central axis. In such an embodiment, turbine rotor hub 32 may comprise a point of extremum 44 wherein turbine rotor hub flow path 34 is at a maximum distance away from central axis 16.

In an embodiment, point of extremum 44 may be located less than half of the distance between rotor leading edge 24, and rotor trailing edge 26. Cambered surface 50 may have a point of extremum 44 positioned at less than 10% of the total distance between leading edge 24 and trailing edge 26. In another embodiment, cambered surface 50 may have a point of extremum 44 positioned at greater than 90% of the total distance between leading edge 24 and trailing edge 26.

The turbine rotor hub 32 may include a second curved portion 42 which may be located between rotor leading edge 24 and first curved portion 40 of cambered surface 50. Thus, in another embodiment, cambered surface 50 may have a point of extremum 44 positioned at greater than 10%, or at greater than 20%, or at greater than 30%, or at greater than 40%, or at greater than 50% of the total distance between leading edge 24 and trailing edge 26. In addition, cambered surface 50 may have a point of extremum 44 positioned at less than 90%, or at less than 80%, or at less than 70%, or at less than 60%, or at less than 50% of the total distance between leading edge 24 and trailing edge 26.

Blades 14 may have a blade height 68 extending radially from trailing edge 26 of turbine rotor hub 32 to a rotor tip 66 located at a blade end 70 of blade 14 located at a trailing edge of blade 14.

In an embodiment, the point of extremum may have a peak height 62 measured radially from point of extremum 44 to a base line 64 which extends from leading edge 24 to trailing edge 26 of turbine rotor 18, which is at least 1% of blade height 68. In another embodiment, peak height 62 may be at least 10% of blade height 68. In still another embodiment, peak height 62 may be at least 20% of blade height 68. In still another embodiment, peak height 62 may be at least 30% of blade height 68.

Figure 6:
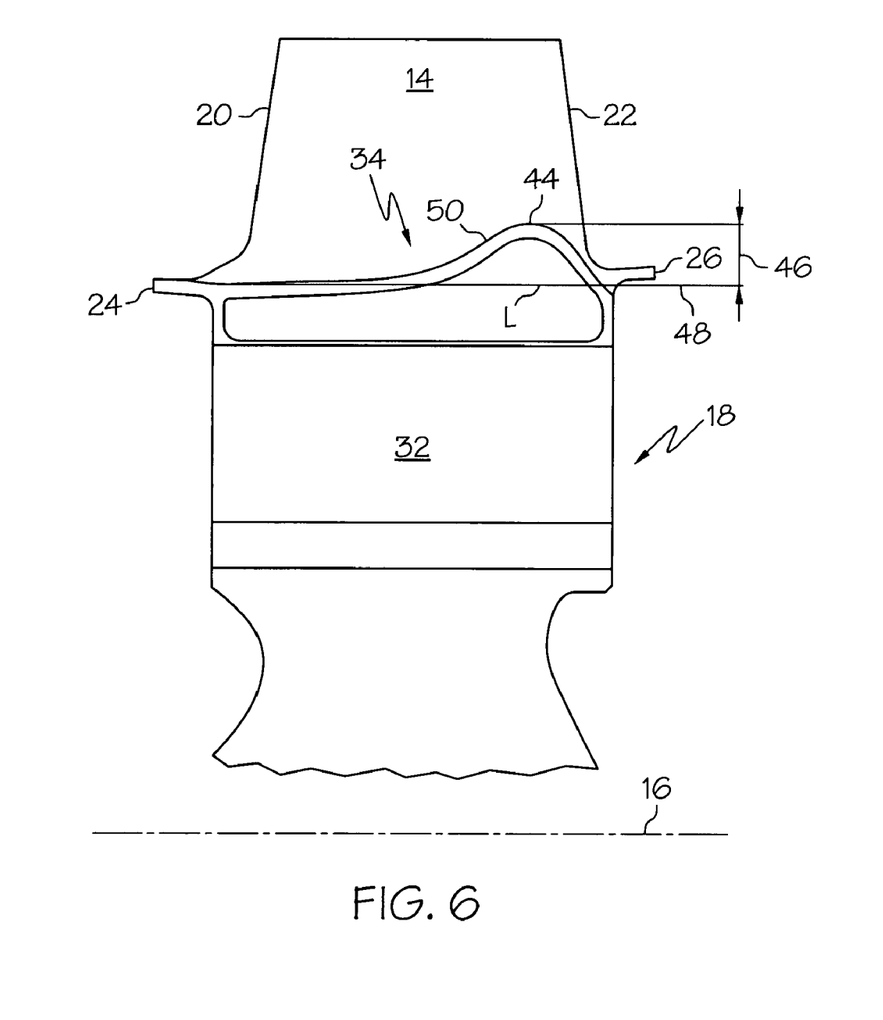
FIG. 6 is a cross section of another embodiment of a turbine rotor of the present invention.

As shown in FIG. 6, in another embodiment, point of extremum 44 may be located more than half of the distance between rotor leading edge 24 and rotor trailing edge 26. In an embodiment, turbine rotor hub flow path 34 may be disposed between two rotor blades 14 extending radially away from rotor hub 32.

Figure 7:
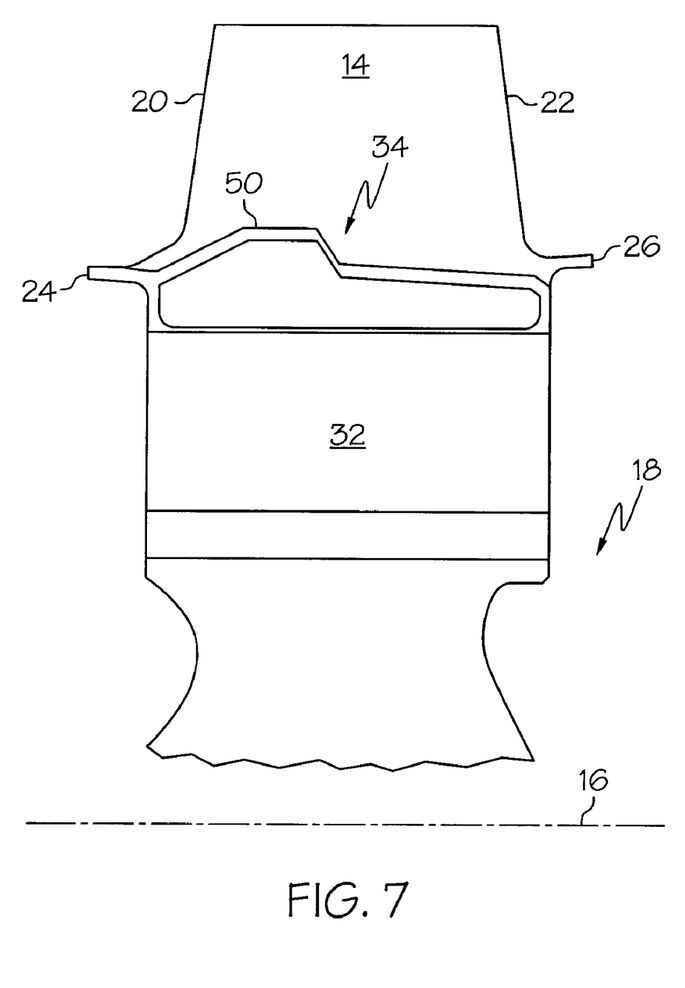
FIG. 7 is a cross section of another embodiment of a turbine rotor of the present invention.

In an embodiment, turbine rotor hub flow path 34 may comprise a cambered (i.e., non-planar) surface 50 having a continuous arc of curvature from rotor leading edge 24 to rotor trailing edge 26. In another embodiment, as shown in FIG. 7, turbine rotor hub flow path 34 may comprise a cambered surface 50 having a non-continuous curvature (i.e., a discontinuity in slope) from rotor leading edge 24 to rotor trailing edge 26.

As shown in FIG. 6, turbine rotor hub flow path 34 may comprise a point of extremum 44 having a peak height 46 which may be measured radially from point of extremum 44 to a base line 48 which extends from leading edge 24 to trailing edge 26 of cambered surface 50. In an embodiment, peak height 46 may be axially located at least 1% of the distance between rotor leading edge 24 and rotor trailing edge 26. In another embodiment, peak height 46 may be axially located at least 5% of the distance between rotor leading edge 24 and rotor trailing edge 26. In still another embodiment, peak height 46 may be at least 10% of the distance between rotor leading edge 24 and rotor trailing edge 26. In yet still another embodiment, peak height 46 may be at least 20%, at least 30%, at least 40%, at least 50%, at least 60%, at least 70%, at least 80%, or at least 90% of the distance between rotor leading edge 24 and rotor trailing edge 26.

In an embodiment, turbine rotor flow path 34 may comprise a cambered surface 50, which may locally accelerate the flow field to eliminate an increased static pressure region (see FIG. 4). The axial location (within the region X1 in FIG. 4) of the maximum height (i.e., peak height 46) for the contour of turbine rotor hub 32 (i.e., point of extremum 44), may be determined by the location of the highest static pressure in the saddle region as shown graphically in FIG. 4. Accordingly, peak height 46 for cambered surface 50 of turbine rotor hub flow path 34 may be determined by analysis of the flow field and static pressure distribution along suction side 38 of rotor blade 14 (see FIG. 2), utilizing flow field analysis methods commonly known to one of skill in the art.

In an embodiment of the present invention, turbine rotor 18 may comprise turbine rotor hub 32 having a plurality of turbine blades 14 spaced circumferentially apart about central axis 16, each of turbine blades 14 extending from a rotor leading edge 24 to a rotor trailing edge 26 of turbine rotor hub 32. The turbine rotor hub 32 may also define a rotor flow path 34 disposed between each adjacent pair of turbine blades, wherein at least a portion of rotor flow path 34 may comprise a first cambered surface 50 from rotor leading edge 24 to rotor trailing edge 26. First cambered surface 50 of turbine rotor flow path 34 may comprise a point of extremum 44 having a peak height 46 measured radially from point of extremum 44 to base line 48, which extends the entire distance from rotor leading edge 24 to rotor trailing edge 26 of turbine rotor hub 32, wherein point of extremum 44 may be located axially at a point on first cambered surface 50 such that a static pressure between a suction side 38 of and turbine rotor hub 32 may be less than a static pressure determined under identical conditions of a comparative second turbine rotor hub having an identical configuration compared to inventive turbine rotor 18, except that second comparative turbine rotor hub may comprise a rotor hub flow path that is flat or planar in the axial direction (see FIG. 4).

Figure 8:
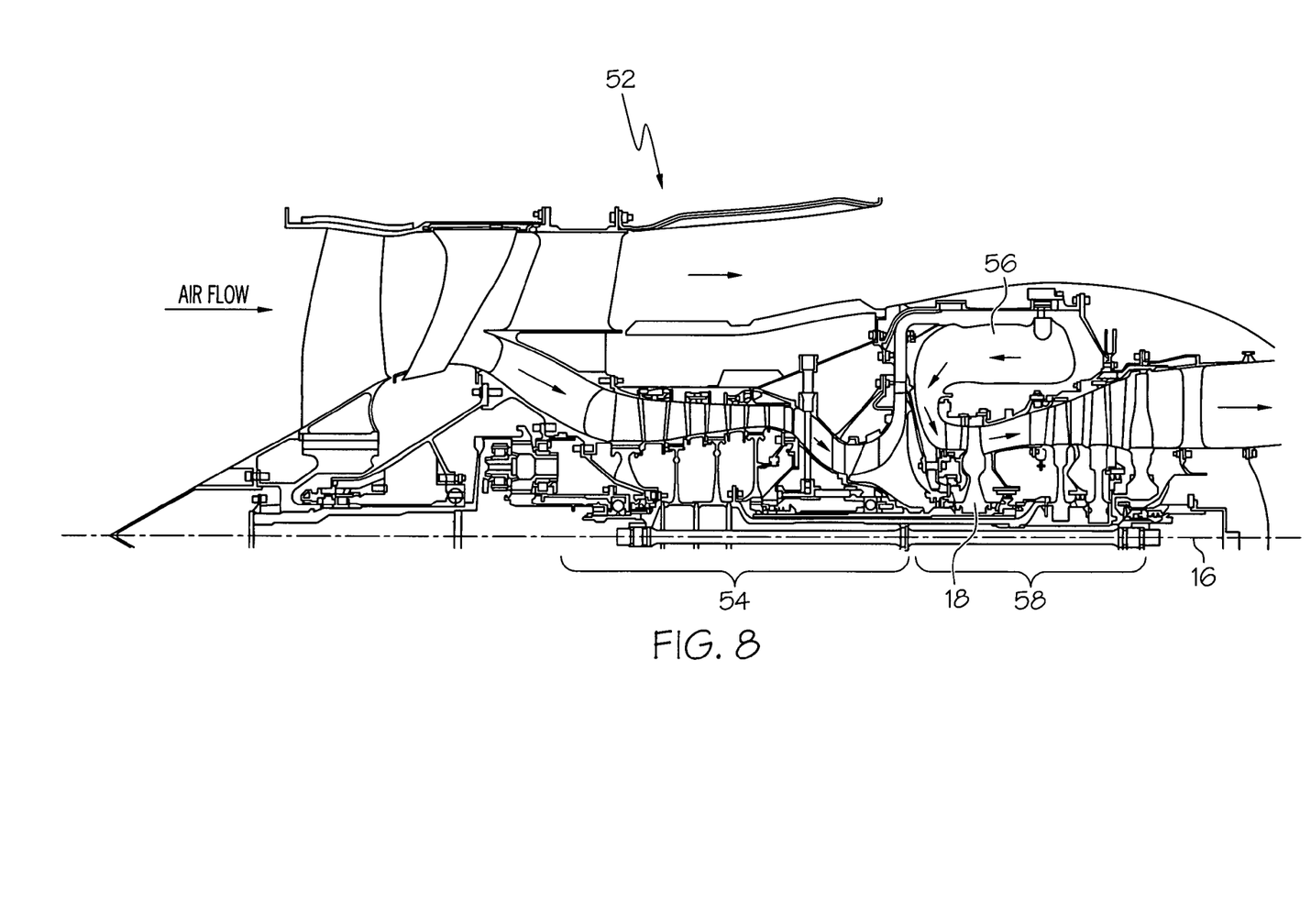
FIG. 8 is a cross section of a gas turbine engine of the present invention.

As shown in FIG. 8, an embodiment of the present invention may also include a gas turbine engine 52 comprising a compressor section 54, a combustor section 56, and a turbine section 58, wherein turbine section 58 may comprise a turbine rotor 18 capable of rotation around central axis 16, and having a turbine rotor hub, which may define flow path 34, and comprising cambered surface 50.

Figure 9:
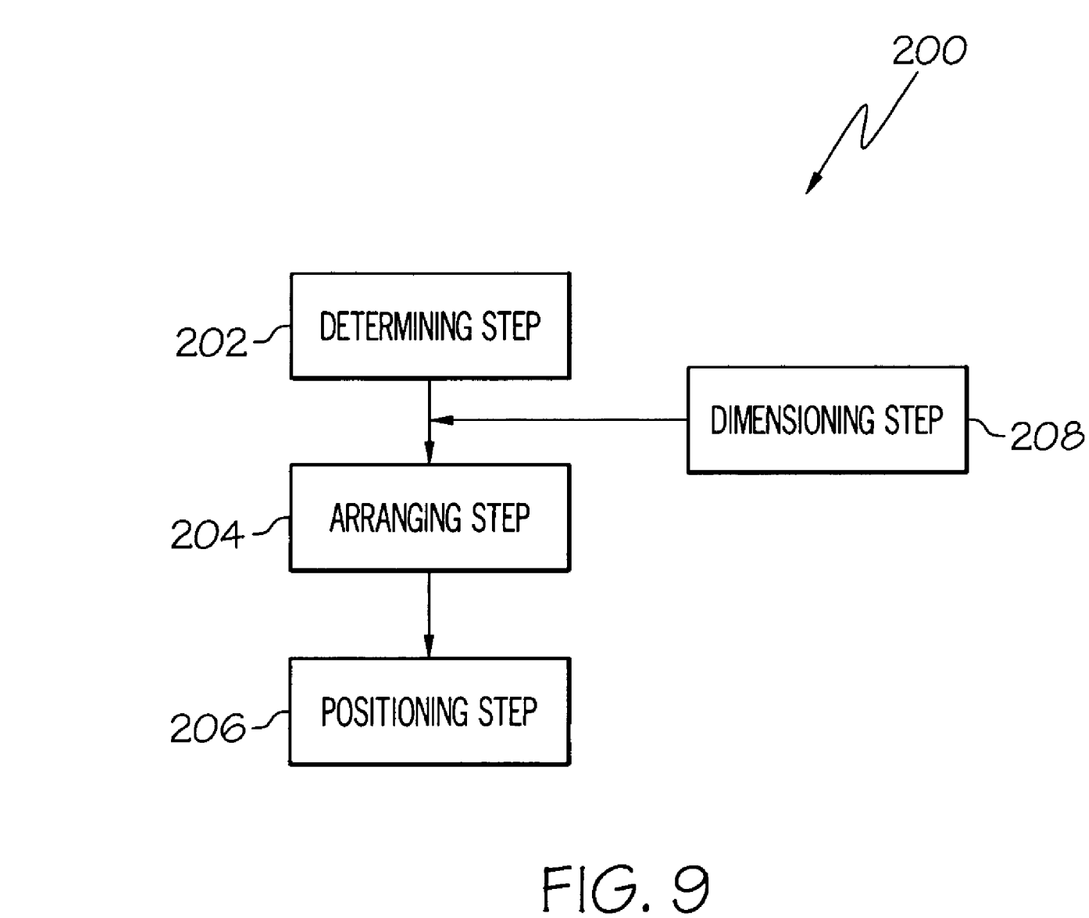
FIG. 9 is a block diagram showing the steps of a method of the present invention.

As shown in the block diagram of FIG. 9, an embodiment of the present invention may also include a method of arranging a turbine rotor flow path on a turbine rotor, represented generally as method 200. Method 200 may comprise a determining step 202, wherein a comparative static pressure profile at a plurality of locations between a suction side of a turbine rotor blade and a turbine rotor hub of a comparative turbine rotor is determined under a set of conditions (see FIG. 4). The comparative second turbine rotor may comprise a comparative second turbine rotor hub having a plurality of blades spaced circumferentially apart about a central axis, each of the blades extending from a leading edge of the comparative turbine rotor hub to a trailing edge of the comparative turbine rotor hub. The comparative turbine rotor hub may further comprise a flat planar rotor hub flow path between each adjacent pair of blades, the flat planar rotor hub flow path extending from the leading edge of the comparative turbine rotor hub to the trailing edge of the comparative turbine rotor hub. Method 200 may also comprise an arranging step 204, wherein the inventive turbine rotor flow path 34 having a cambered surface 50, is arranged on a turbine rotor hub 32 of turbine rotor 18 such that the static pressure profile of the surface of turbine rotor hub 32 is less than the comparative turbine rotor hub's static pressure profile when measured under identical conditions.

Method 200 may also comprise a positioning step 206, wherein the cambered surface 50 has a point of extremum 44, and wherein point of extremum 44 may be positioned at an axial location of the surface of turbine rotor hub 32 wherein the comparative static pressure profile was at a maximum value (see FIG. 4).

In an alternative embodiment, method 200 may also include a dimensioning step 208 wherein the cambered surface 50 may be dimensioned and arranged to minimize the static pressure profile using flow field analysis methods known to one of skill in the art.

It should be understood, of course, that the foregoing relates to preferred embodiments of the invention and that modifications may be made without departing from the spirit and scope of the invention as set forth in the following claims.

We claim:

1. A turbine rotor comprising an axially cambered surface extending at least a portion of the distance from a leading edge of a rotor hub to a trailing edge of said rotor hub along a central axis of said rotor hub, the axially cambered surface comprising:

a first planar portion angled toward the leading edge of the rotor hub, relative to the central axis;

a second planar portion angled substantially parallel to the central axis; and a third planar portion angled toward the trailing edge of the rotor hub, relative to the central axis.

2. The turbine rotor of claim 1, wherein said turbine rotor flow path is disposed between two adjacent turbine blades, said turbine blades extending radially away from said rotor hub to a rotor tip.

3. The turbine rotor of claim 1, wherein said cambered surface has a point of extremum between said leading edge and said trailing edge of said rotor hub.

4. The turbine rotor of claim 1, wherein the angle of the first planar portion is less than the angle of the third planar portion.

5. The turbine rotor of claim 1, wherein the angles of the first planar portion and the third planar portion are substantially the same.

6. The turbine rotor of claim 1, wherein the cambered surface has a point of extremum at an intersection of the first and second planar portions.

7. The turbine rotor of claim 1, wherein the cambered surface has a point of extremum at an intersection of the second and third planar portions.

8. The turbine rotor of claim 1, wherein the cambered surface has a point of extremum in the second planar portion.

* * * * *